(12) United States Patent
Stuart

(10) Patent No.: US 10,529,455 B2
(45) Date of Patent: Jan. 7, 2020

(54) DIELECTRIC WALL ACCELERATOR AND APPLICATIONS AND METHODS OF USE

(71) Applicant: Martin A. Stuart, Altadena, CA (US)

(72) Inventor: Martin A. Stuart, Altadena, CA (US)

( * ) Notice: Subject to any disclaimer, the term of this patent is extended or adjusted under 35 U.S.C. 154(b) by 393 days.

(21) Appl. No.: 15/037,437

(22) PCT Filed: Nov. 21, 2014

(86) PCT No.: PCT/US2014/066803
§ 371 (c)(1),
(2) Date: May 18, 2016

(87) PCT Pub. No.: WO2015/077554
PCT Pub. Date: May 28, 2015

(65) Prior Publication Data
US 2016/0293279 A1 Oct. 6, 2016

Related U.S. Application Data

(60) Provisional application No. 61/907,169, filed on Nov. 21, 2013.

(51) Int. Cl.
*G21H 1/04* (2006.01)
*G21C 1/02* (2006.01)
(Continued)

(52) U.S. Cl.
CPC .................. *G21C 1/02* (2013.01); *G21C 7/00* (2013.01); *G21C 7/36* (2013.01); *G21G 4/06* (2013.01);
(Continued)

(58) Field of Classification Search
CPC . H05H 9/005; H05H 7/08; H05H 7/22; G21C 1/02; G21C 7/00; G21C 7/36; G21H 1/04; G21G 4/06
See application file for complete search history.

(56) References Cited

U.S. PATENT DOCUMENTS 4,812,775 A 3/1989 Klinkowstein et al.
4,993,033 A 2/1991 Lin
(Continued)

FOREIGN PATENT DOCUMENTS

GB 2246467 A 1/1992
JP 04-280100 A 10/1992
(Continued)

OTHER PUBLICATIONS

European Organization for Nuclear Research; CERN/AT/95-44 (ET); "Conceptual Design of a Fast Neutron Operated High Power Energy Amplifier"; C. Rubbia, J.A. Rubio, S. Buono 1), F. Carminati, N. Fietier 2), J. Galvez, C. Geles, Y. Kadi, R. Klapisch, P. Mandrillon 2), J.P. Revol and Ch. Roche.

*Primary Examiner* — Lily C Garner
(74) *Attorney, Agent, or Firm* — Bodi Law LLC

(57) ABSTRACT

Provided are a plurality of embodiments, including, but not limited to, a device for generating efficient low and high average power output Gamma Rays via relativistic particle bombardment of element targets using an efficient particle injector and accelerator at low and high average power levels suitable for element transmutation and power generation with an option for efficient remediation of radioisotope release into any environment. The devices utilize diamond or diamond-like carbon materials and active cooling for improved performance. Also provided are a nuclear reactor and a decontamination device using such a device.

35 Claims, 11 Drawing Sheets

(51) Int. Cl.

| | | |
|---|---|---|
| *G21G 4/06* | (2006.01) | |
| *H05H 9/00* | (2006.01) | |
| *H01J 9/14* | (2006.01) | |
| *H05H 7/08* | (2006.01) | |
| *H05H 7/22* | (2006.01) | |
| *G21C 7/00* | (2006.01) | |
| *G21C 7/36* | (2006.01) | |
| *H05G 2/00* | (2006.01) | |

(52) U.S. Cl.
CPC .............. *G21H 1/04* (2013.01); *H01J 9/14* (2013.01); *H05H 7/08* (2013.01); *H05H 7/22* (2013.01); *H05H 9/005* (2013.01); *H05G 2/00* (2013.01); *H05H 2007/081* (2013.01)

(56) References Cited

U.S. PATENT DOCUMENTS

| | | | |
|---|---|---|---|
| 5,018,180 A | 5/1991 | Shoulders | |
| 5,054,046 A | 10/1991 | Shoulders | |
| 5,076,971 A | 12/1991 | Barker | |
| 5,123,039 A | 6/1992 | Shoulders | |
| 5,263,070 A * | 11/1993 | Kumaoka | G21C 1/02 376/361 |
| 5,280,252 A | 1/1994 | Inoue et al. | |
| 5,724,668 A | 3/1998 | Wood et al. | |
| 5,757,146 A | 5/1998 | Carder | |
| 5,811,944 A * | 9/1998 | Sampayan | H05H 9/00 315/500 |
| 5,821,705 A | 10/1998 | Caporaso et al. | |
| 6,025,681 A | 2/2000 | Yu et al. | |
| 6,147,274 A | 11/2000 | Wood et al. | |
| 6,433,336 B1 | 8/2002 | Jongen et al. | |
| 6,936,971 B2 | 8/2005 | Chukanov | |
| 7,015,661 B2 | 3/2006 | Korenev | |
| 7,173,385 B2 | 2/2007 | Caporaso et al. | |
| 7,440,568 B2 | 10/2008 | Rhodes | |
| 7,576,499 B2 | 8/2009 | Caporaso et al. | |
| 7,596,208 B2 | 9/2009 | Rifkin et al. | |
| 7,622,726 B2 | 11/2009 | Zillmer et al. | |
| 7,683,556 B2 | 3/2010 | Aoi et al. | |
| 8,050,377 B2 | 11/2011 | Russell, II et al. | |
| 8,097,765 B2 | 1/2012 | Minehara | |
| 8,264,174 B2 | 9/2012 | Liu et al. | |
| 8,470,131 B2 | 6/2013 | Studt | |
| 2002/0169351 A1 | 11/2002 | Brown | |
| 2003/0094911 A1 | 5/2003 | Chukanov | |
| 2004/0030215 A1 | 2/2004 | Wickland et al. | |
| 2005/0013397 A1 | 1/2005 | Csom et al. | |
| 2006/0151803 A1 | 7/2006 | Wesner et al. | |
| 2007/0013315 A1 | 1/2007 | Rhodes | |
| 2007/0280398 A1 * | 12/2007 | Dardik | G21B 3/00 376/100 |
| 2008/0043910 A1 | 2/2008 | Thomas | |
| 2009/0323885 A1 | 12/2009 | Bowman | |
| 2010/0059665 A1 * | 3/2010 | Sampayan | H05H 9/00 250/251 |
| 2010/0094266 A1 | 4/2010 | Travish et al. | |
| 2010/0150292 A1 | 6/2010 | Hyde et al. | |
| 2010/0172458 A1 | 7/2010 | Leung et al. | |
| 2010/0217060 A1 | 8/2010 | Minehara | |
| 2010/0264426 A1 | 10/2010 | Blair | |
| 2010/0305383 A1 | 12/2010 | Livingston | |
| 2011/0101891 A1 * | 5/2011 | Caporaso | H05H 7/00 315/501 |
| 2011/0273115 A1 | 11/2011 | Liu et al. | |
| 2013/0211172 A1 | 8/2013 | Lensa et al. | |

FOREIGN PATENT DOCUMENTS

| | | | |
|---|---|---|---|
| JP | 2003057392 A * | 2/2003 | |
| JP | 2003057392 A | 2/2003 | |

* cited by examiner

DIELECTRIC WALL ACCELERATOR AND APPLICATIONS AND METHODS OF USE

CROSS-REFERENCES TO RELATED APPLICATIONS

This application is the national phase of International Application No. PCT/US2014/066803 filed on Nov. 21, 2014, which claims the benefit of priority to U.S. Provisional Patent Application No. 61/907,169 filed on Nov. 21, 2013. The entire disclosures thereof are incorporated herein by reference. This application is related to International Application No. PCT/US2014/038386 filed on May 16, 2014, incorporated herein by reference, which claims the benefit of priority to U.S. Provisional Patent Application No. 61/824,654 filed on May 17, 2013, incorporated herein by reference.

BACKGROUND

Dielectric wall accelerators are discussed in U.S. Pat. No. 5,811,944, incorporated herein by reference, where the technology concept provided a substantial performance improvement over other existing technologies prevalent at that time. In concept, the energy concentration, or rather the high voltage gradients proposed in the concept, were at odds with the materials and techniques of that day. The concept may work, but the material combinations for components were being operated at their limits and breakdowns with lifetime limits were a challenge for utilizing the devices produced.

Hence the performance of the device is strongly influenced by the materials used to construct it. Indeed, the available materials and fabrication techniques were the primary limiting factor.

SUMMARY

Provided are a plurality of example embodiments, including, but not limited to, efficient low and high average power output Gamma Ray generation via relativistic electron bombardment of element targets with 90 or higher nucleons; efficient electron injector and accelerator for compact free electron lasers; and efficient and compact proton acceleration with neuron spallation generation at low and high average power levels suitable for element transmutation and power generation with an option for efficient remediation of radioisotope release into any environment.

Also provided is an emitter device comprising: a source of charged particles; a capacitor element for accelerating the charged particles, the capacitor element including a cathode electrode and also including an anode electrode; and a conduit formed through the capacitor element for transmitting the charged particles, wherein at least one of the capacitor electrodes is at least partially coated with diamond or diamond-like carbon.

Further provided is an emitter device comprising: a source of charged particles; a conduit; a plurality of capacitor elements stacked to form a capacitor array configured to accelerate the charged particles through the conduit which is formed through the capacitor array, each one of the capacitor elements comprising: a cathode electrode having a layer including diamond or diamond-like carbon, an anode electrode having a layer including diamond or diamond-like carbon, and a plurality of photo switches arranged around the capacitor element for activation during a discharge of the capacitor element; and a cooling system for circulating a coolant in the device for cooling the device.

Also provided is an emitter device comprising: a source of charged particles; a conduit; a plurality of capacitor elements stacked to form a capacitor array configured to accelerate the charged particles through the conduit which is formed through the capacitor array, each one of the capacitor elements comprising: a cathode electrode having a layer including diamond or diamond-like carbon, an anode electrode having a layer including diamond or diamond-like carbon, and a plurality of photo switches each including a diamond crystal and being arranged around the capacitor element for activation during a discharge of the capacitor element; and a cooling system for circulating a coolant in the device for cooling the device, wherein the device is adapted to emit gamma rays as a result of accelerating the charged particles.

Further provided is method of generating gamma rays using a particle accelerator device, comprising the steps of: generating a stream of particles; supplying the stream of particles to a capacitor array comprising a plurality of discharging stacked capacitors each utilizing a diamond or diamond-like carbon coating on electrodes comprised therein; and accelerating the stream of particles using the capacitor array by discharging the capacitors of the capacitor array using one or more photo switches associated with the discharging capacitor.

Also provided is a method of manufacturing a particle accelerator comprising the steps of: manufacturing a plurality of capacitor electrodes; coating each one of the capacitor electrodes with diamond or diamond-like carbon; providing a plurality of photo switches; manufacturing a plurality of capacitor elements, each of the capacitor elements comprising a pair of the electrodes and a plurality of the photo switches; and stacking the plurality of capacitor elements on a core forming a conduit through which accelerated particles are transmitted.

Further provided is method of manufacturing a gamma ray emitter device, comprising the steps of: manufacturing a particle accelerator including the steps of: manufacturing a plurality of capacitor electrodes, coating each one of the capacitor electrodes with diamond or diamond-like carbon, providing a plurality of photo switches each including a diamond crystal, manufacturing a plurality of capacitor elements, each of the capacitor elements comprising a pair of the electrodes and a plurality of the photo switches, the capacitor elements each including a space for forming at least one channel; and stacking the plurality of capacitor elements on a core forming the at least one channel and a conduit through which accelerated particles are transmitted, wherein the at least one channel is adapted for receiving a coolant for cooling the particle accelerator; manufacturing a source of particles comprising an inner electrode operated at a first polarity surrounded by a plurality of outer electrodes operated at a second polarity and including a coolant system for cooling the source of particles; and arranging the source of particles with the particle accelerator in a housing to form the gamma ray emitter device.

Also provided is a nuclear reactor using any of the above emitter devices to control a rate of reaction of fuel in the reactor. Further provided is a decontamination device using any of the above emitter devices to decontaminate a contaminated target.

Also provided is nuclear reactor comprising: a radioactive fuel source; an emitter device configured to generate gamma rays directed at the radioactive fuel source to induce a nuclear reaction in the fuel source; a containment system for containing the radioactive fuel source and the emitter device; and a heat extraction system configured to extract heat from the reactor for transmission outside of the reactor.

Further provided is a nuclear reactor comprising: a radioactive fuel source and an emitter device configured to generate an energy beam directed at the radioactive fuel source to induce a nuclear reaction in the fuel source, the emitter device comprising: a source of charged particles, a plurality of capacitor elements for accelerating the charged particles, each capacitor element including a pair of electrodes, and a conduit formed through the capacitor element for transmitting the charged particles. At least one of the capacitor electrodes is at least partially coated with diamond or diamond-like carbon.

Still further provided is the above reactor also comprising: a cooling system for cooling the emitter device; and a radioactive fuel source; and a heat extraction system configured to extract heat from the reactor for transmission outside of the reactor.

Also provided is a method of controlling a nuclear reaction in a nuclear reactor including a nuclear fuel, comprising the steps of: generating a controlled beam of gamma rays; and directing the beam of gamma rays into the nuclear fuel to control the rate of radioactive decomposition of the nuclear fuel.

Further provided is a method of decontaminating a radioactive target, comprising the steps of: providing an emitter device configured to generate gamma rays; providing a gamma ray focusing and directing apparatus configured to direct the gamma rays generated by the emitter device toward a contaminated target; and using the gamma rays emitted by the emitter device toward the radioactive target to at least partially decontaminate the contaminated target.

Still further provided is a decontamination device comprising: an emitter device configured to generate an energy beam; a gamma ray focusing and directing apparatus configured to direct the energy beam generated by the emitter device toward a contaminated target; a controller for controlling the emitter device and the gamma ray focusing and directing apparatus; and a mobile platform configured to transport the emitter device and the decontamination device.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTIONS OF EXAMPLE EMBODIMENTS

Presented are examples of Diamond Dielectric Wall Accelerator (DDWA) architectures with designs for use of materials and fabrication techniques, with which to fabricate higher performance levels for such devices, at arguably lower costs than previous designs. The proposed architecture incorporates practical means of constructing, mounting and insulating the very high operating voltages, while cooling the device for high average power use as well. The DDWA can use any of a number of existing particle generator devices to provide source particles, although a dense plasma flux proton injector (DPF) representing an improvement on existing devices, described below with respect to FIG. 1, can also be utilized.

Note that throughout this document, the term DLC is used to describe diamond-like carbon, a material that may come in various forms, all comprising carbon that displays properties similar to those of diamond, like hardness giving good wear properties, slickness, and that can have high electrical insulation capability, while also having good to excellent heat conducting capability, such as the thermal conductivities in the range of metals (in the tens to many hundreds of W/m-K), to the excellent thermal conductivity of pure diamond (around 1000 W/m-K). Furthermore, some forms of DLC may even have semiconductor properties. This DLC material typically includes carbon at least partially organized in a diamond-like structure, and may contain significant amounts of $sp^3$ hybridized carbon atoms. Unlike pure diamond, DLC materials can be made flexible and amorphous. In some of its forms, DLC material may contain actual synthetic diamond material. For the purposes of this disclosure, DLC formulations are preferred that offer high electrical insulating capabilities while also having good to excellent heat conducting capabilities. Other materials having similar properties, such as diamond composites and diamond powders, among others (such as specialized polymers or ceramics that may include diamond-like or actual diamond materials), could be substituted for the DLC material described below.

Figure 1:
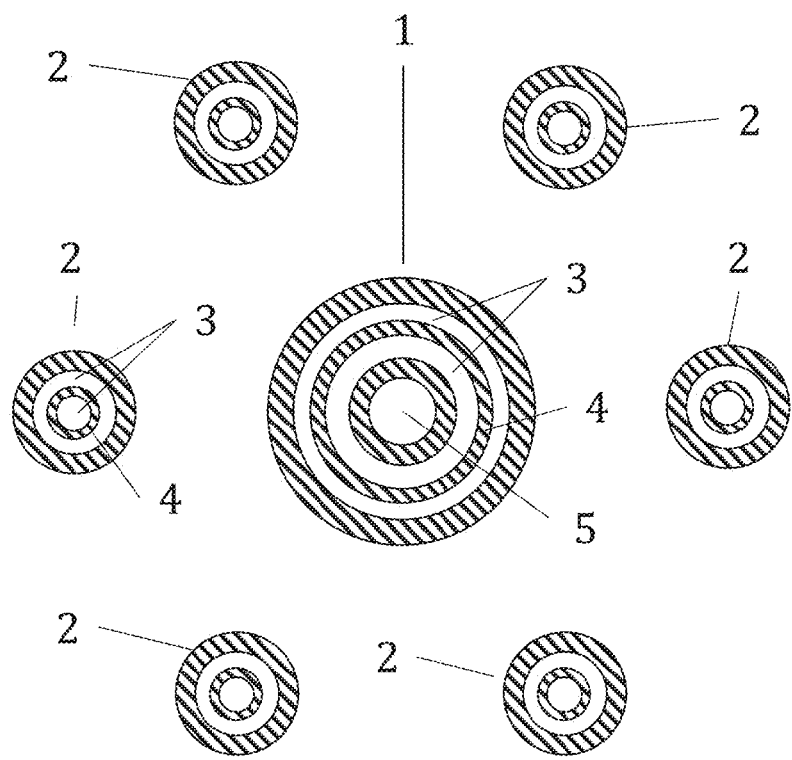
FIG. 1 is a partial schematic of an axial view of an example water cooled particle injector (DPF) for use with an example Diamond Dielectric Wall Accelerator (DDWA)

FIG. 1 shows a schematic drawing of an example particle injector that is a water cooled dense plasma focus (DPF) proton injector with the image shown as if looking from the bore of the DDWA acceleration tube, like a compression rail gun like device. The housing and peripheral components of this device are not shown. The DPF can be used with an example DDWA having a stacked capacitor array constructed of robust parallel electrodes (forming individual capacitors). The DPF of FIG. 1 includes central water cooled particle injector electrodes 1 and smaller water cooled outer electrodes 2 that are themselves large enough in diameter to support uniform internal cooling fluid circulation using water flow channels 3, one of which can be an inlet, with the other used as an outlet, and a water divider 4 provided between the incoming and outgoing water channels to divide the flows.

Each electrode 1, 2 can be made of all metal, semiconductor, or conductive ceramic composite materials, such as boron (which is electrically conductive when hot) or silicon carbide, or some other suitable conductive material. Also provided is a central bore 5 mounted directly in front of, and inline with, the electrodes in a robust vacuum tight, insulated window that is of a thin plate of so called low Z number materials (nuclei with under 20 Protons and neutrons) which can be actively cooled (e.g., water cooled), for separating the DDWA from the injector assembly, which would permit mounting the indicated electrode array into a vacuum manifold suitable for generating and conducting particles or nuclei of atoms into an aperture of a particle accelerator, which for the DDWA would be on the outer side of the window. As shown, several electrodes are arranged in an array making a coaxial cylindrical pattern. Further, the electrodes are arranged in a pattern with the one central cathode electrode 1 that is larger in diameter and that is designed with a central hollow tube with the inner annular water cooling channel designed and built into the wall of this tube. The device is also provided with any number of secondary anode electrodes 2 surrounding the central electrode jacket in a concentric pattern, with the smaller peripheral electrodes 2 arraigned in a cylindrical array around the central larger electrode 1.

Each secondary peripheral anode electrode 2 is connected to a high voltage high energy capacitor bank (not shown) and comprises a discrete pulse forming network, with the central cathode electrode 1 being used to facilitate high average and peak power discharges with very high voltages in very short time domains. At a given time, all anode electrodes 2 are fired simultaneously and an arc of very high currents is generated in a low pressure gas, such as a gas comprising hydrogen boride provided at close proximity to each electrode surface. Arcs propagate from a virtual ground plane, which is at the base or support structure of the electrodes, to the tip of the hollow or annular central cathode electrode 1. This is a very fast event with the final result that the arcs propagate to and over the connecting electrode material that comprises the inner and outer surfaces of the central cathode electrode 1 at which point the arcs reach beyond the contact surface and join in the central portion of the bore. At this point, a beam of electrons or protons is ejected from this region where a plasma has been generated. The annular active cooling region of each electrode permits high repetition rates which increases beam currents.

In the example case, the innermost tube has an inner jacket that is sealed to the outer jacket at the farthermost end from the mounting plate, thereby permitting water to flow between the two annular jackets (channels 3) of the inner electrode tube. This is for the purpose of cooling the electrodes in the region where the plasma is generated and where all electrons are striped from the vaporized material that is intended to be accelerated. This bore is also the introduction point for a gas (Hydrogen, Deuterium or Nitrogen is used in most cases) or ions of any material that becomes more highly ionized in this environment, and in the case of Hydrogen provides the Protons themselves that are accelerated and injected into the DDWA bore, through the window. This window is provided by the desire for a hard vacuum in the bore of the accelerator tube of the DDWA and the partial pressure 12 torr±10 torr of (by way of example) hydrogen gas in the plasma focus device injector (DPF).

If the DPF particle injector is to be used for fusion reactions between hydrogen and boron, the inner tube would be provided as one monolithic tube without active fluid cooling, however it would be conductively cooled, and it could be made out of Boron. An alternate approach is to use the all metal DPF with Boron Hydride gas at low pressures consistent with prior art patents.

A DDWA architecture using the DPF or another type of particle injector can be used to accelerate protons or electrons. Such a design allows production of relativistic speeds and, in the case of electrons, directs the electrons at dense high Z nuclear targets (above 90 nucleons); high energy gamma rays are produced with a useful efficiency, such as 30%, being not uncommon. In this example configuration, the DPF is operated somewhat differently. The particle discharge from the plasma region where the separate arcs join axially expels protons in one direction away from the ground plane of the DPF, and expels electrons 180 degrees in the polar opposite direction. Therefore, if it is operated in this configuration with respect to the DDWA input aperture, a device can be provided to use beams of electrons rather than of protons.

This is one reason the disclosed design can be provided with an annular double walled (allowing internal coolant flow) central tube with an aperture that goes all the way through the central tube. The aperture of the central tube thus permits utilizing the particles (e.g., electrons) if so desired by mounting the DDWA such that the DPF injects the particles (protons, electrons, beta particles, etc.) into the DDWA. This accelerator configuration permits the particles, such as electrons, to be accelerated to relativistic speeds, if desired, in extraordinarily short devices, such as would be useful in producing gamma rays from atomic species with 90 or more nuclear particles in the nucleus in the emitter target.

The Diamond Dielectric Wall Accelerator (DDWA) of the example embodiments described below can be provided to, for example, operate at 125 kV per capacitor accelerator element or more. At the 125 kV level, an accelerator head needed to achieve 45 MeV electrons that would be expected to produce 16 MeV Gamma Rays would be on the order of 36 cm long. This would be compared to 2 MeV per meter in a quadruple Radio Frequency accelerator of conventional design.

In this example application, each discharge of the DPF creates high electric currents (in a monolithic solid tube electrode) that are mirrored on the inner surface. These currents ionize and accelerate hydrogen gas into the end of the central electrode; at this location each discharge path creates tornado-like plasma discharge at the very end of the tube where ionized and accelerated protons are able to be trapped within a single vortex apex region, within the central bore of the boron tube. It is at this exact point that the combined plasma discharges are concentrated and some of the boron operating at high temperatures can encounter hydrogen ions that are also stripped of their electrons (i.e., protons) and be acted upon by the combined plasma vortexes at the very center of the end of the central electrode that is, in this case, made from Boron. In this location the magnetic forces from the individual vortexes also concentrate the plasma and create the conditions for fusion reactions to occur. The resulting helium and unreacted protons are able to be the injection material for subsequent acceleration within the DDWA. The advantage to this scheme is that the particles will be accelerated from the plasma injector at several hundred keV of energy or speed. This shortens the needed acceleration tube length within the DDWA to achieve a certain purpose.

Any atomic plasma ions or gas ions can be so accelerated. The electrode material would not necessarily be boron for non-fusion based reactions. In this case, the plasma focus device is only a compact ion accelerator/injector.

The architecture of the Dielectric Wall Accelerator (DWA) segment receiving the DPF particles is comprised of a hollow cylinder that forms the vacuum containment section of the particle accelerator. The chosen design length for this example tube segment is about a meter long or more. It is constructed to be an insulated, large (4 cm in this case) bore tube constructed of adjacent parallel rings of metal film imbedded and mounted and insulated from each other, within the sufficiently thick wall of the tube. These metal film rings form a capacitor network that has an effect of averaging the voltage gradient of the sequentially fired capacitors that are stacked on the outside wall of the accelerator tube. The effect is due to a mirrored charge, induced and thus impressed upon each ring which represents an individual capacitor element within the wall of the bore tube.

The current propagating along the electrode skin of each of the discharging capacitor elements forming a pulse forming network (PFN) are in fact supplying the accelerating electromotive force, acting upon any charged particle within the bore of the accelerator tube, by the act of being sequentially fired in a very controlled timed sequenced event (described below), an accelerating force of very high specific energy density is applied to the particles within the tube.

Although gallium arsenide or silicon carbide photoswitches, such as those used in prior applications, could be used as the active component to facilitate controlled very short time duration conduction at high voltages, permitting switching at high voltages and high currents upon the illumination of a several nanosecond laser pulse delivered via a discrete optical fiber, such devices typically operate at high currents at lower voltages or hi voltages at lower currents. These are discussed in U.S. Pat. No. 4,993,033, incorporated herein by reference, and in "Wide Bandgap Extrinsic Photoconductive Switches by J. S. Sullivan, Lawrence Livermore National Laboratory, Jan. 20, 2012, also incorporated herein by reference (hereinafter "Reference A"). Single diamond crystal or DLC photo-switches (i.e., replacing the gallium arsenide or silicon carbide with the diamond material) overcome these mentioned limitations. The salient point is that the prior art materials have a breakdown voltage of 3-3.5 million volts per meter, whereas single crystal diamond and 70% tetrahedral DLC diamond has a breakdown voltage of 10 Billion volts per meter. This permits a practical single crystal diamond photo switch to have a breakdown voltage for a 1 mm device at 10 million volts. Clearly, the breakdown voltage of a cooling medium such a device resided or operated in could be the dominant operational factor. The Breakdown voltage for highly deionized water is 400 kV/cm. This suggests using a photo switch placement architecture that maximizes the material characteristics of the DDWA The architecture of the placement of the capacitor elements or layers is such that there is a space between each capacitor disc, which is a layer of discretely spaced ribs on one face of the disc, which permits the forced flow of the deionized water coolant along the axis of the tube and capacitor array but which exits transverse to the axis of the tube through the spaces created between the capacitor disc elements of the PFN due to the presence of the described ribs. The water is pumped into the apex spaces of the polygonal (e.g., hexagonal) hole, constituting the inner aperture and cumulative water manifold, of the individual capacitor segment. A series of discrete capacitors are stacked next to each other forming a capacitor array, the axial sum of capacitors supplying the energy storage and providing a fast discharge circuit of the sequentially fired PFN. A single capacitor element can be comprised of two parallel plate transmission lines (electrodes) stacked upon one another with one or more photo switches mounted between the two conductors.

Figure 2:
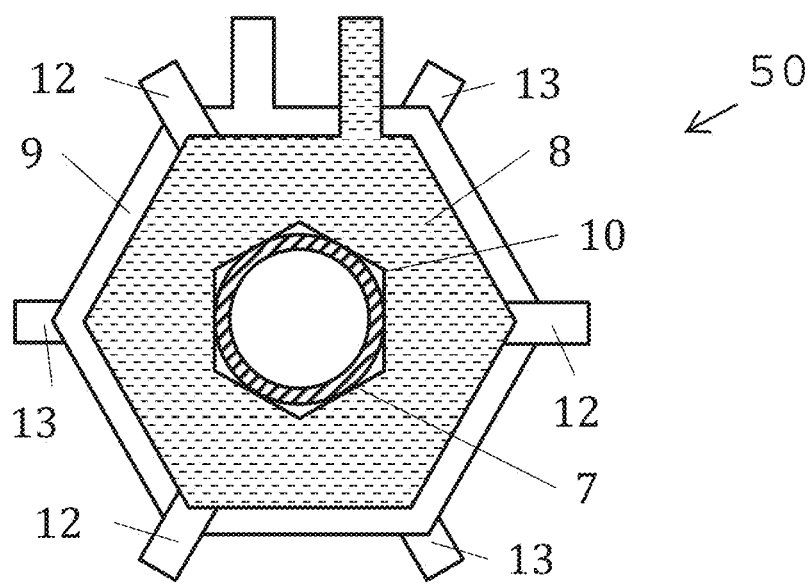
FIG. 2 is a schematic of an example capacitor element of the dielectric wall accelerator region of an example DDWA.

FIG. 2 shows a schematic of a dielectric wall accelerator region of an example capacitor element 50 for the example DDWA. The DDWA is formed by stacking a plurality of such regions 50 (i.e., stacking a plurality of capacitor elements). The DDWA includes a central particle vacuum tube conduit 7 that passes through all of the stacked elements 50. The element 50 includes a first diamond coated capacitor plate 8 (one provided for each capacitor acceleration element forming a resulting high voltage pulse forming a network (PFN)). A second diamond coated capacitor plate 9 (one per capacitor element) provides a ground reference for the element 50 of pulse forming network (PFN). A hexagon aperture 10 is provided in the capacitor elements, with the aperture 10 constituting central coolant flow channels. Three single crystal diamond plate photo switches 12 are provided in axial sequence in the polygon PFN accelerator capacitor elements. Single crystal Diamond photo switches 13 are provided for the next-in-sequence polygon PFN accelerator capacitor elements. The diamond coatings on the capacitor plates (electrodes) can be comprised of diamond crystal, or diamond-like carbon (DLC), that can be deposited using a deposition process, for example. Furthermore, a Teflon coating or other coating can be provided over the diamond or DLC layer to waterproof the layer. Note: While in some embodiments, capacitor elements could share electrodes with an adjacent capacitor thereby reducing the number of such elements, such as disclosed in Reference A, this is not the preferred construction architecture.

The example DDWA device is provided as a hexagonal polygon as the configuration of the outside shape of the design (in this case a hexagon); in fact, the polygon can be provided to have many edges suitable to mount photo switches onto them. However, each capacitor will typically have 3 or more photo switches 12 on each layer, so as to provide for uniform simultaneous current discharge across the face of the diamond coated insulated capacitor element 50, and the adjacent layers will have their own photo switches 13 mounted such that the adjacent layers' photo switches will fit between the apexes of the adjacent layers. This will permit their operation without interference—specifically from arc over through breakdown of the deionized water used as an insulator and coolant. By this method each capacitor element will evenly discharge around the periphery allowing a nearly uniform current discharge of each discrete layer. The thickness and placement of the photo switch(s) 12, 13 and capacitor layers 8 will be accommodated to permit their designed operation. Taking the breakdown voltage of deionized water into account, the minimum spacing of 125 kV potential (as exemplified in this device) the photo switch electrodes need to be not less than 4 mm apart with the safe design parameter being 1 cm for a 3 time safety factor at a design voltage of 125 kV.

Each individual photo switch can be accessed and activated by an individual fiber optic coupler mounted to the outside edge. This facilitates a transmitted q switched laser pulse of sufficient intensity (e.g., 10-15 milliJ each) and under controlled timing such as to allow the single crystal synthetic diamond to become a fast, high current conductor, thus short circuiting the capacitor and producing a high current discharge constituting a firing event for particle acceleration.

Figure 3:
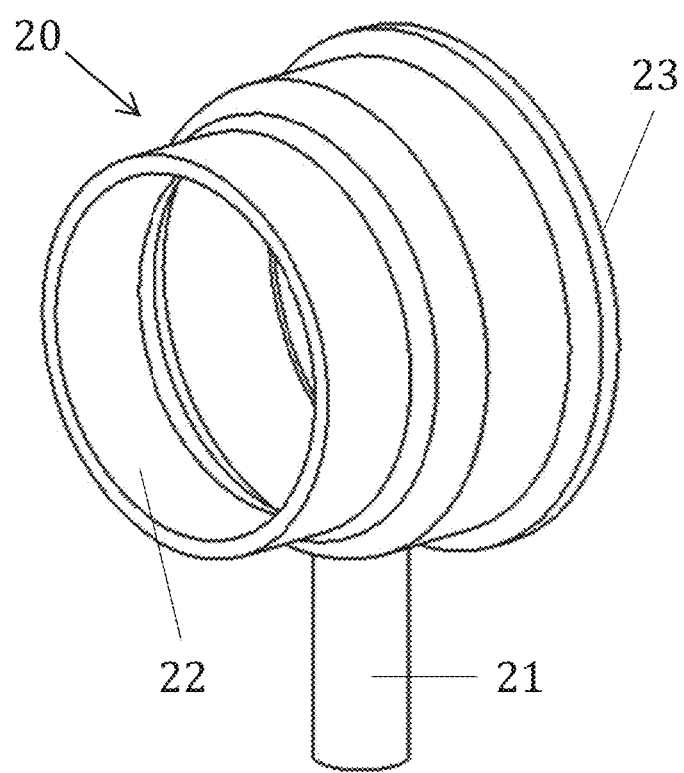
FIG. 3 is a schematic of a cooling water jacket used with the example DDWA.

FIG. 3 shows an example cooling water jacket 20 which covers the end of the vacuum cylinder. This jacket 20 includes a water input/output port 21, a water seal to central vacuum tube conduit 22, and a water seal to accelerator polygon capacitor element 23.

Figure 4:
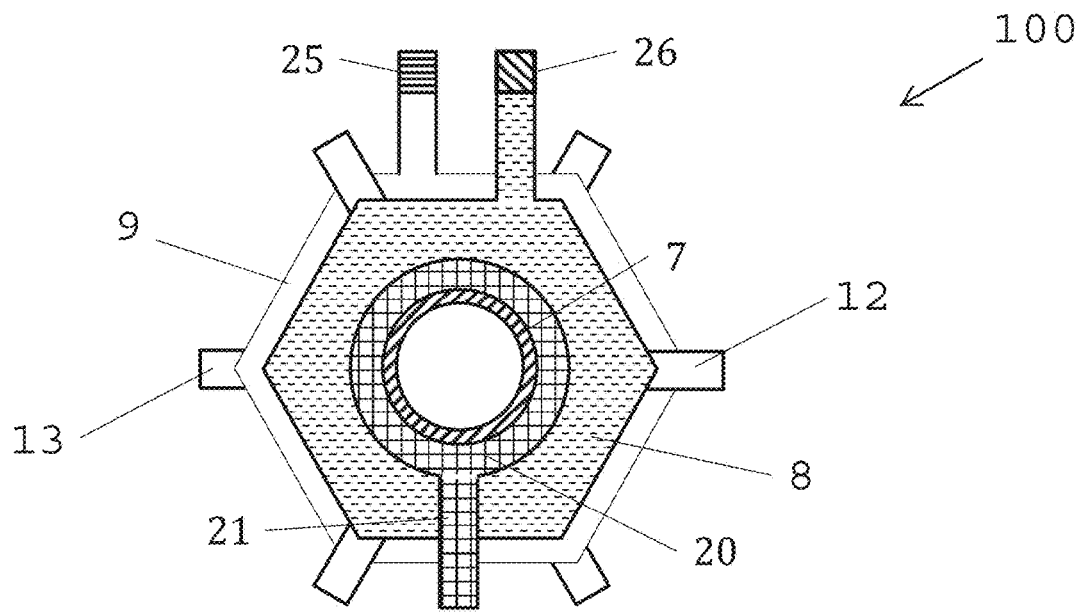
FIG. 4 a schematic of an end view of the end capacitor element of the dielectric wall accelerator region of the example DDWA with the cooling water jacket.
Figure 5A:
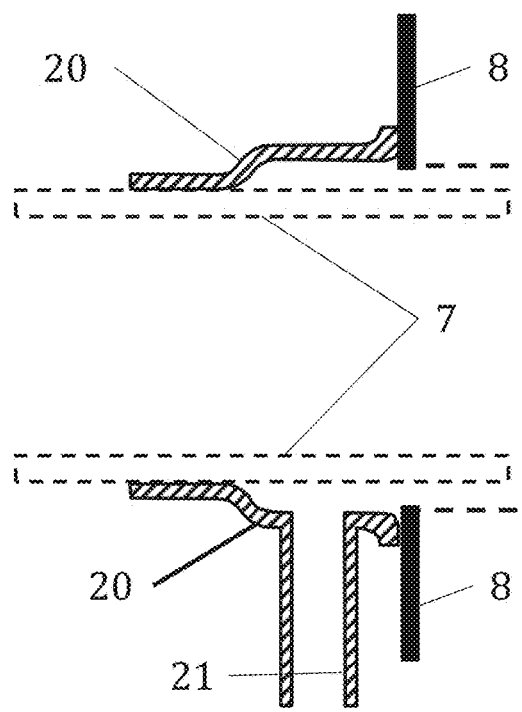
FIG. 5A is a schematic of a cross section view of the end element of the example DDWA of FIG. 4.
Figure 5B:
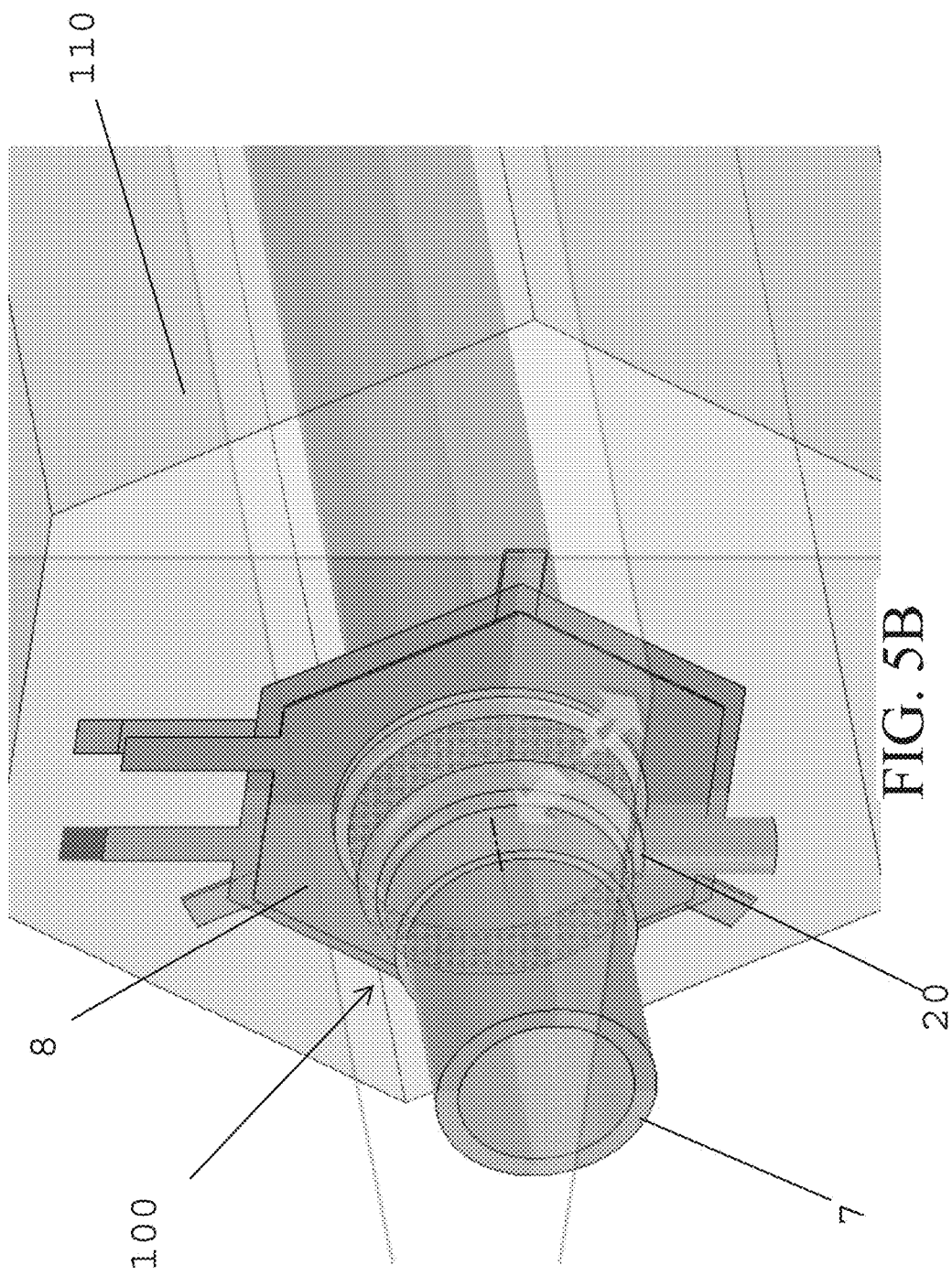
FIG. 5B is a schematic phantom view showing part of the example DDWA device.

FIG. 4 shows a schematic of an end view of the end capacitor 100 of the example DDWA, showing the central particle vacuum tube conduit 7, the water cooling jacket 20, the in/out cooling port 21, a ground reference PFN capacitor plate contact 25 for an adjacent capacitor layer, and a high voltage PFN capacitor contact element 26 for the capacitor layer 8. FIG. 5A is a cross section view of the cooling water jacket over the end capacitor of central dielectric wall vacuum tube showing many of the same components. FIG. 5B is a schematic diagram showing a DDWA device in phantom with the end capacitor 100 of FIG. 5A shown within a water cooled containment vessel 110 to form the DDWA device. Only a single capacitor element (the end element) is shown in this FIG. 5B, but in an actual device a plurality of the capacitor elements 50 (as shown in FIG. 2) would also be stacked on the tube conduit (core) 7 to form a stack of the capacitor elements. The particle source generator may or may not also be included within the containment vessel 110.

Some of the features that are new in this DDWA technology, each of which constitute optional features of the disclosed example design, include, but are not limited to:

1) The use of Diamond-Like Carbon (DLC) (or diamond) provided on all the surfaces of the capacitor electrode elements except the charging strip electrode tab or conductor—shown as a strip reaching out from the larger portion of the disc that is representative as a design of the capacitor element. There is also a specific exception to this DLC film where the actual photo switch contacts are provided to be mounted onto the electrode conductor. The DLC film can be deposited using a Pulsed Laser Deposition (PLD) using a laser, for example (such as the slab laser disclosed in U.S. patent application Ser. No. 13/566,144 filed on Aug. 3, 2012, and incorporated herein by reference).

2) A secondary PLD created film, such as of hexagonal barium titanate (h-BaTiO$_3$) ceramic dielectric, can also be used in the region between the electrodes. The DLC is a suitable dielectric to support operation of the DDWA, but the inclusion of high saturation voltage dielectrics such as barium titanate or titanium dioxide is a designer option.

3) The rib structures (potentially PLD created) on the face or faces of each disc capacitor element, whose purpose is to create a cooling plenum for in this case deionized water.

4) The synthetic single crystal doped such as optionally with nitrogen or undoped-Diamond wafer/s that comprise the high voltage high current Photo switch element, placed and spaced around the individual capacitor elements to create or facilitate a uniform current flow during a discharge, but also sealed within an encapsulating DLC layer. However the described DLC layer in some cases need not cover the Face or optical pulse entrance facet, but rather only the exposed conductive metallized layer that permits the mechanical bonding and electrical pathway of the electrodes.

5) The polygon shaped—(hexagonal in the examples shown in the figures) central aperture or hole in the individual capacitor elements which facilitates water, sulfur hexafluoride, or oil insulator flow in alternate apexes that can be forced to be in opposition or opposite directions. This feature permits cooling from opposite directions which doubles the effective length of the cooled section of the accelerator bore tube. This feature can be significant, because as the proposed coolant is forced down the length of the outer wall of the tube, it will heat up. Unless mitigated, there will be a point at which water will begin to boil and oil would begin to carbonize in high average power operation. This simple feature increases the power that can be loaded into the length of the device at any given coolant flow level and also by virtue of this design, allow unpressurized operation of the coolant enclosure structure. In some applications this significantly increases the beam current of the overall device.

6) Deionized water or coolant pumped throughout the device along the outside wall along the axis of the vacuum tube then out through the spaces between the capacitor elements. Highly deionized water has a breakdown voltage of 400 kV per cm, if deionized to 18 MOhms per centimeter, which permits cooling and compact architecture of the device. The cooling level permits kilohertz repetition rates, thus facilitating high average power beam currents. The use of water also permits the well-established and mature technology of water Deionization resistance measurement devices to be used as a feedback system control element by the controlling computer.

7) Diamond-Like Carbon (DLC) or diamond is used as a dielectric insulator on the capacitors' plates and electrodes, and the matrix making up the Dielectric Wall Accelerator tube itself. The breakdown voltage of pinhole free DLC is about 10 kV per micron. The proposed design employs a 0.001 inch thick multilayer DLC/graphite architecture to facilitate stress free fabrication and permit small mechanical vibration waves, generated from the discharge pulse, to be accommodated.

8) Single crystal synthetic diamond is used as the photo switch slab mounted in several places around the periphery of each capacitor element. This single crystal synthetic diamond slab is further created with a total internal reflector on all edges except the input window. This feature facilitates uniform light illumination within the photo switch slab and lowers the required input energy to activate the switch.

9) The DLC is principally applied by high speed Pulsed Laser Deposition (PLD), such as disclosed in U.S. patent application Ser. No. 13/566,144 filed on Aug. 3, 2012, and incorporated herein by reference; however, other methods to create single crystal diamond or amorphous polycrystalline diamond-like carbon also exist that, while slower, is a technology that could also be used to create described films.

10) Each discrete capacitor element is constructed such that optional dielectrics can be applied such as hexagonal barium titanate is deposited in a controlled thickness via PLD to adjust the energy storage of each capacitor element. This layer is created on the outside of the DLC layer and is itself sealed with a DLC layer that is sealing the DLC to expansion matched graphene, iron-nickel or molybdenum alloy constituting the electrode of the capacitor.

11) The architecture of the design of each capacitor element is such that the thickness of each photo switch can be placed on the apex mounting pad on the capacitor disc that is a polygon, such that the adjacent capacitor disc and the placement of its own photo switch elements will not interfere with the operation of the next adjacent capacitor element.

12) The indicated capacitor layer is polygonal as opposed to the Blumlein strip configuration (see U.S. Pat. No. 2,465,840 and Reference A, incorporated herein by reference) of previous designs, this is facilitated by the even placement of the photo switches around the periphery of the capacitor element.

13) The timing control circuit that fires the charged PFN array, can be controlled by a single synchronized q switched laser pulse utilizing the IFM U.S. Pat. No. 8,220,965 (incorporated by reference) being amplified to sufficient intensity and energy content, via a master oscillator pulse amplifier (MOPA). This then permits injecting said light pulse into a sequential optical pick off fiber launch manifold (comprising partial reflectors redirecting part of the light pulse into said fiber optic lines) would then permit the length of each individual fiber optic line to exactly control the timing and sequence of the arriving light pulse into each individual photo switch.

14) Subsequent timing adjustment can be further facilitated by having a variable distance path length or variable thickness high refractive index material delay line such as SF-11 glass, on each fiber launch line, which would be adjustable via computer commands to a linear actuator holding the individual fiber launch focus head. This feature facilitates the same DDWA device being able to accelerate different atomic species as the timing of higher Z particles, or rather heavier atoms, can be adjusted by the computer controlled spaces between the fiber optic collimators under their control. By this method one could change the timing thus creating a controlled delay sufficient to accommodate the slower to be accelerated particle or species. By this means the timing delays required to accommodate different isotopic species in the same architecture, to be accelerated would be facilitated.

Example System Designs: The examples fall into several design architectures. The average beam current from the DDWA is related to the choice the designer wishes to achieve, based on the size of the contact surface area of the single crystal synthetic diamond photo switch, and hence the cooling surface area in conjunction with the designer chosen dielectric on disc size of each element.

The example base DDWA design can use 1 cm×1.5 cm switch elements run at 3 locations around the DDWA accelerator capacitor element. This choice permits a several hundred to several thousand pulses per second firing rate. The heat generated in the photo switches and the coolant's ability to remove that heat are the limiting factors to power input. The capacitor diameter and thus surface area in conjunction with the dielectric material choice, will determine the per accelerator element energy storage. This set of choices will result in an average beam current of 12 mA with the acceleration voltage in increments of 125 kV per mm of accelerator length device—stacked capacitor elements. These elements are stacked adjacent to each other on the Dielectric Wall Beam tube-device length. The described architecture with about 45 MeV at 0.012 amps will produce a beam power of about ½ MW. When this electron beam is directed onto a Thorium Oxide or Depleted Uranium Oxide ceramic target, about 30% of the electron beam will be converted into Gamma Rays of 10-17 MeV.

A Gamma Ray Emitter Design

Figure 6:
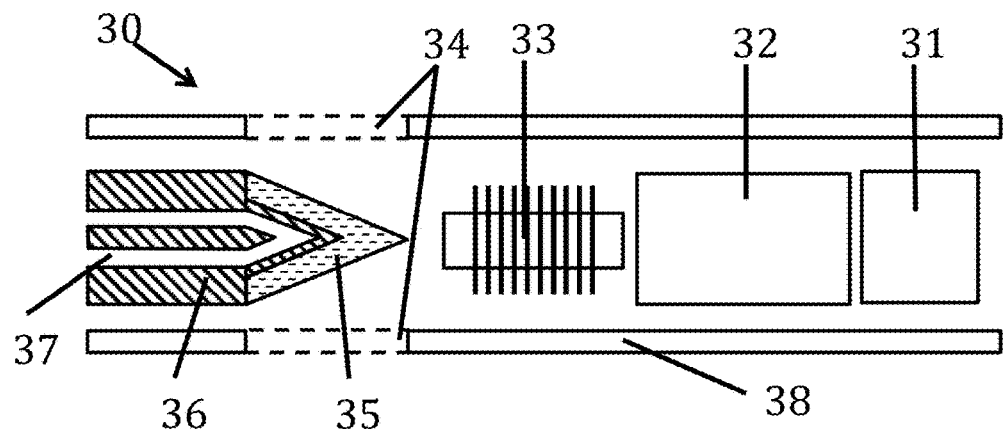
FIG. 6 is a schematic of an application of the example DDWA used as a source for a gamma ray emitter.

FIG. 6 shows a schematic of a DDWA gamma ray emitter device as described herein used as a source for emitting gamma rays. This setup includes: a particle injector 31 (such as an improved dense plasma fusion (DPF) device as described regarding FIG. 1, for example); a diamond dielectric wall accelerator assembly (DDWA) 32; a reflectron 33; a gamma ray window 34 (e.g., an alumina ceramic—sapphire—edge defined grown tube window or sintered ceramic tube); a gamma ray emitter cone 35 (e.g., a high temperature high atomic weight material, such as reference thorium oxide); a heat exchanger submount 36 (e.g., a reactively created silicon carbide cooling plenum); and a vacuum containment cylinder 38 providing utility structure support. A water channel 37 can be provided for circulating a coolant (such as water, $CO_2$, air, or some other coolant) for cooling the device.

At the proposed power inputs, in order to handle the generated emitter waste heat, the backside of the (example) thorium oxide cone is hollowed to permit a target to be cooled by $SCO_2$ or deionized water. This gamma ray radiation flux will fission adjacent radioisotopes in a reactor chamber, from thorium and/or uranium, down to the above mentioned species and produce about 20-25 times as much recovered electrical energy from a complete reactor system.

The electron beam, and/or if chosen the proton beam, should travel in a vacuum or near vacuum. Due to the applied heat energy in the form of particles onto the emission target, there will be a tendency in a practical device for the emission material to evaporate and coat everything in the chamber. While thorium oxide is arguably the least likely material to do this, the sputtering effect will occur at different rates for every material processed.

A component to prevent this from happening to the DDWA and internal beam tube surfaces will be the reflectron 33 and/or a high voltage ring electrode that will apply a repulsive negative voltage to any reflected Ions in the chamber from the emission target.

The Reflectron is an electrostatic particle mirror typically used in time-of-flight mass spectrometers. In the case of a relativistic particle they are a one way check valve. It is constructed out of a stack of thin conductive polygon metal plates, often made from brass, that have mounting holes drilled near each corner or apex of the polygon. In the central portion of each plate is a larger aperture that is a significant portion (approximately 70%) of the diameter of the described plate. These plates are subsequently mounted a small distance from each other typically 5-6 mm with insulating screw-bushings, after which a resistor is attached to each layer to its neighbor of nearly the same resistance. This will produce a uniform voltage gradient along it length when a high negative (for electrons and positive for protons and alpha particles) voltage is applied to one end with the other attached to ground. For some embodiments:

The reflectron is mounted between the DDWA output aperture and the reactor chamber entrance aperture as part of the DPF-DDWA-Reflectron particle emitter design. Therefor it is next to the reactor chamber. This is enclosed within the aperture tube or vacuum chamber but mounted in an arm for architecture reasons.

The base architecture is one DPF-DDWA-Reflectron arm—attached to a vacuum reactor chamber such that the accelerated electron beam will be directed at the Gamma Ray emitter target.

The Emitter target can have a plurality of beam arms aimed and arrayed around the target on the wall(s) of the reactor chamber. The assumption is that the designer wishes to convert radioactive material into lesser or ultimately non-radioactive material by generation and irradiation of sufficiently energetic gamma rays of materials within the reactor chamber;

The particle beam will produce gamma rays of sufficient strength, e.g., MeV levels, to photo fission any particular nuclear species by virtue of the parameter chosen operating voltage. This in turn is expected to result in over unity heat with which to produce thermal to electric power conversion at elevated temperatures. Therefore the heat management system, e.g., the input heat exchangers upon which the emitter target and transmutation candidate materials will determine the power rate at which the core and surrounding radioactive material shall be operated and converted at. The exception to this assumption will be the final stage if a troublesome target atomic species that the designer or customer wishes to transmutate into non-radioactive stable isotopes as a final daughter product.

Therefore, the example system as described has been architectured to permit specific tailored particle beam energy levels with which to create specific tailored chosen gamma rays at MeV levels and beam currents, which can be used to transmute by photo fission any element and its isotopes. This is a description of an architecture that permits multiple variations of choices based on a designer's choice menu. In practice, this architecture can support power generation at almost any level.

Nuclear Reactor Applications

The DPF-DDWA-Reflectron emitter concept enables Photo fission reactors to become practical, providing very dense compact power generation devices on the order of the size of a consumer refrigerator.

This is a complimentary process for Neutron spallation driven subcritical reactors such as described by Nobel Laureate Carlo Rubbia and J. A. Rubio who was the director of CERN. However the prior art concepts function at smaller sizes down to a 6 tonne fuel load compared to the 27 tonne fuel load of Dr. Rubbia's paper on Energy Amplifiers. Such a size device would fit within standard 10 Meter shipping container sized modules, as assemble-able subsections. The target system design would fit within a 20 meter cube or a Sixty five foot cube. The beam energy in Rubbia's Energy Amplifier was 1 billion electron volts and the current was 12.5 milliamps. In contrast, the described DDWA is capable of generating this beam in a package that is a 7,000 times smaller device and can be built at similar price reductions.

The Proton to Neutron spallation concept has been proposed for use as a central subcritical Nuclear power generation system. The example design would generate 1.5 GW thermal, producing 600 MW electrical (producing 750 MW utilizing the SCO2 Rankin Cycle Engine which is incorporated above) to 340 MW Thermal producing 170 MW electrical systems (also utilizing the $SCO_2$ RCE).

An example accelerator complex might produce a 1 Billion electron volt or BeV proton beam that is directed through an evacuated beam tube traversing the 20 meters of liquid lead coolant. This is terminated with a 3 mm thick domed Tungsten window. This is arranged such that the 1 BeV Protons travelled through liquid lead 30 cm above the fuel core which was toroid cylinder with the aperture permitting neutron spallation and attenuation of excess energy and liquid coolant flow. While doing so, the level would drop from as produced 1 MeV Neutrons to as low as 25 Kev neutrons toward the bottom of the core 1.5 meters lower. At a 1 BeV energy level, Protons will produce approximately 30-1 MeV Neutrons per Proton in 30 cm of lead. In this concept, the Accelerator complex can be comprised of 10 accelerators that are approximately 70 meters long each—with each about the size of a 7 car freight train.

By comparison, an example of the described DDWA that would produce the same energetic Proton beam is about 10 meters long and 30 cm in diameter. This represents a volume reduction of about 7,000 times, for example. A DDWA Electron to Gamma Ray Photo fission design that can operate at power levels down to kilowatts and do so on biologically troublesome Neutron resistant reactor waste products such as $I^{129}$, $Sr^{90}$, $Cs^{137}$, $Tc^{99}$ can be provided. Such devices can utilize a completely closed nuclear fuel power cycle, resulting in no residual radioactive products or waste. An Isotope separator, such as a laser device, can provide a non-aqueous or dry plasma based process with no opportunity for liquid based solvents to retain or transport any residual trace amounts of radioactive species into the environment. This is compared to the current aqueous PUREX reprocessing or alternately, the proposed Pyro-Processing which utilizes molten salts and though an improvement at 99.9% capture. The desired average beam current from the DDWA for such an application is related to the choice the designer wishes to achieve, based on the size of the contact surface area of the single crystal synthetic diamond Photo switch.

An example emitter design uses a 1 cm×1.5 cm switch elements runs at 3 locations around the DDWA accelerator capacitor element. This choice permits several hundred to several thousand pulses per second firing rate. The heat generated in the Photo switches and the coolants ability to remove that heat are the limiting factors to power input. This set of choices will result in an average beam current of 12 ma with the acceleration voltage in increments of 125 kV. Per mm of capacitor elements. These elements are stacked adjacent to each other on the Dielectric Wall Beam tube-device length. The described architecture with about 45 MeV at 0.012 amps will produce a beam power of about ½ MW. When this electron beam is directed onto a Thorium Oxide or Depleted Uranium Oxide ceramic target, about 30% of the electron beam will be converted into Gamma Rays of 10-17 MeV.

At this power input, in order to handle the generated emitter waste heat, the backside of, for example, a Thorium oxide cone is hollowed to permit the target to be cooled by $SCO_2$. This Gamma Ray Radiation flux will Fission adjacent radioisotopes in the reactor chamber—From Thorium and/or Uranium, down to the above mentioned species and produce about 20-25 times as much recovered electrical energy as conventional approaches. In such systems, the inner wall is lined with transmutation candidate materials that are produced in their most stable form whether that is an oxide, metal pellet or rod or pebble. The inner surface of the reactor chamber is made of reacted Silicon Carbide panels shaped to mount to form the inner surface and secure the fuel in whatever form it is made into.

The Electron beam, and/or if chosen the Proton beam, should travel in a vacuum or near vacuum (or through an inert atmosphere). Due to the applied heat energy in the form of particles onto the emission target, there will be a tendency in a practical device for the emission material to evaporate and coat everything in the chamber. While thorium Oxide is arguably the least likely material to do this, the sputtering effect will occur at different rates for every material processed.

A component that can be used to avoid this occurring to the DDWA and internal beam tube surfaces is the reflectron and/or a high voltage ring electrode that will apply a repulsive negative voltage to any reflected Ions in the chamber from the emission target, as discussed above.

A dominant characteristic is that the DDWA-reflectron beam arm will be used in one or more locations around a compact transmutation chamber. Each arm will add the ability to convert and generate power from these radioactive materials at specific determined rates to be chosen by the designer;

As an example, if the designer wishes to transmute $I^{129}$, $Sr^{90}$, $Cs^{137}$, or $Tc^{99}$, then 10-17 MeV Gamma Rays per second, will increase the decay rate by 180 times. This specifically means that since several of these materials that might have half-lives of 30 years will be reduced to 60.8 days. As such, the latent decay energy will be released at a rate that is 180 times higher, and in this system this heat energy can be utilized to produce power.

Figure 7:
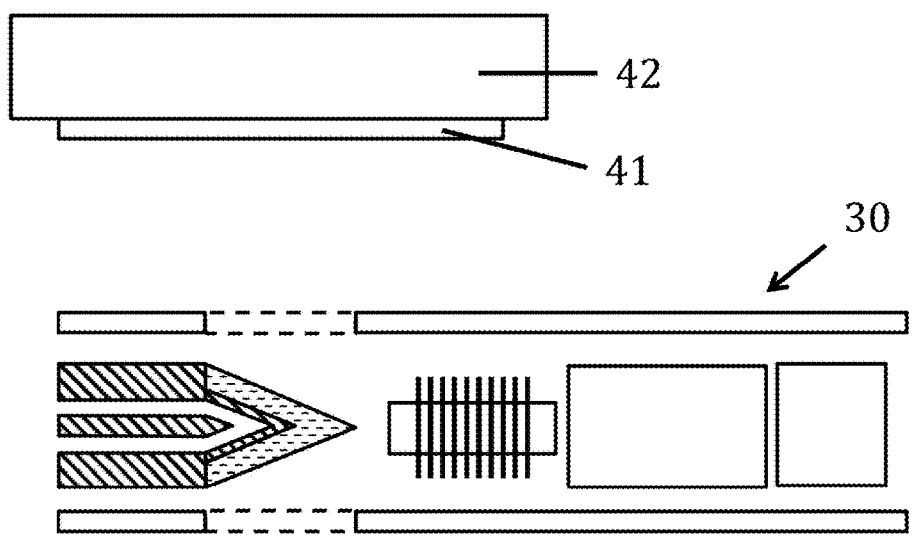
FIG. 7 is a schematic of the example gamma ray emitter of FIG. 6 used in an example reactor.
Figure 7:
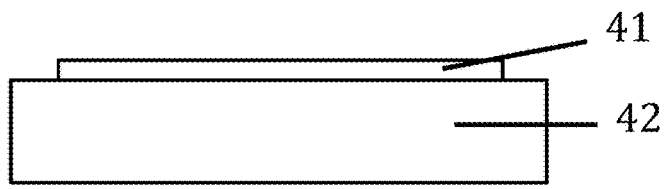

FIG. 7 shows an arrangement of a DDWA emitter device for nuclear power generation, with the DDWA emitter used as a source for emitting energy beams mounted onto a single emitter target—Reactor chamber (further examples described below) with heat input Exchangers adjacent to fuel panels. The device comprises a DPF-DDWA-Reflectron emitter Assembly 30 as described above, with a Nuclear Fuel Target 41 as a target of the generated Gamma Rays, and Heat Exchangers 42. The fuel targets comprise a radioactive nuclear fuel (as described elsewhere herein) for undergoing a fission reaction for generating heat.

Figure 8:
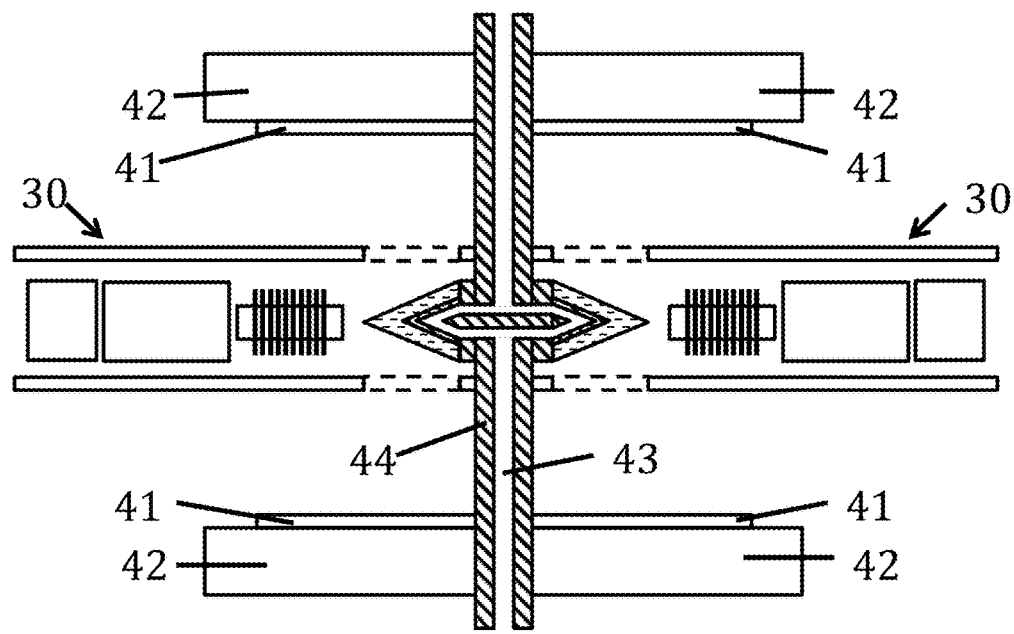
FIG. 8 is a schematic of another example gamma ray emitter using a pair of DDWAs used in an example reactor.

FIG. 8 shows an alternative arrangement using a pair of DDWAs arranged in series as an emitter to work with a pair of fuel targets 41 and heat exchanger 42 for increasing power output. In addition, a cooling device 44 having a cooling channel 43 can be used to cool the emitter device, and hence making the reactor capable of substantially higher power operation.

Figure 9:
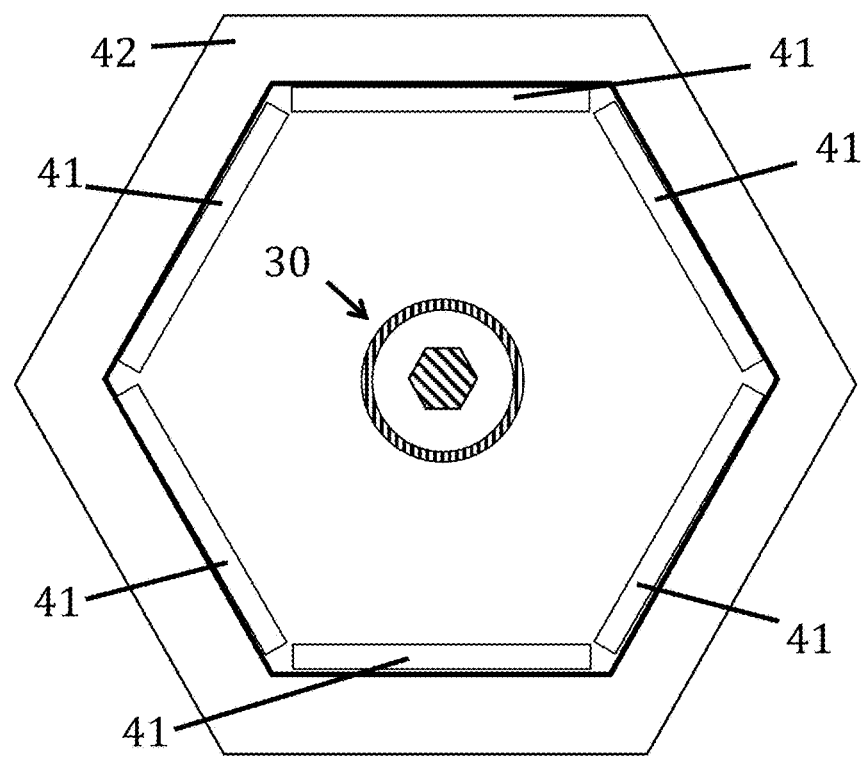
FIG. 9 is a schematic of another example gamma ray emitter used in another example reactor.

FIG. 9 shows an end view of a further alternative reactor system having a hexagonal arrangement that can be used as a reactor fuel assembly, comprising a plurality of the fuel targets 41 and heat exchangers 42 each provided as a "wall" of the hexagonal structure, with a DDWA emitter 30 (or series of emitters such as shown in FIG. 8). This device provides further efficiencies in generating power.

Figure 10:
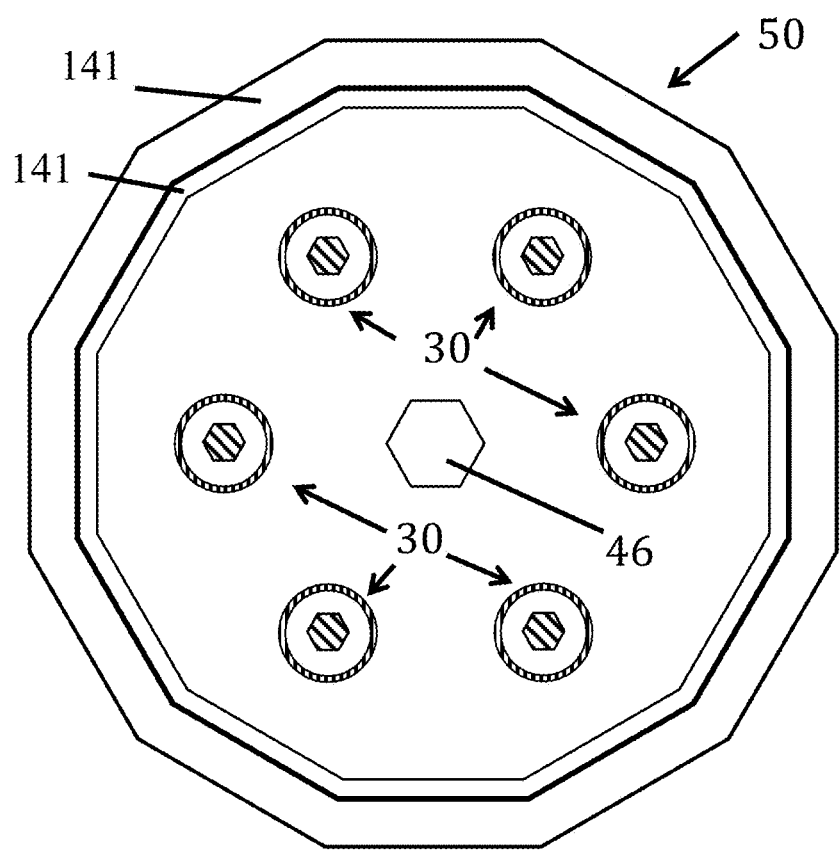
FIG. 10 is a schematic of using a plurality of example gamma ray emitters in another example reactor.

FIG. 10 shows another alternative design showing an end view of an assembly 50 comprising multiple DDWA emitters 30 provided in a hexagonal arrangement within a single fuel target assembly 141 and heat exchanger 142. A central support structure 46 can be provided to support the DDWAs 30 and additional structures, as desired.

Figure 11:
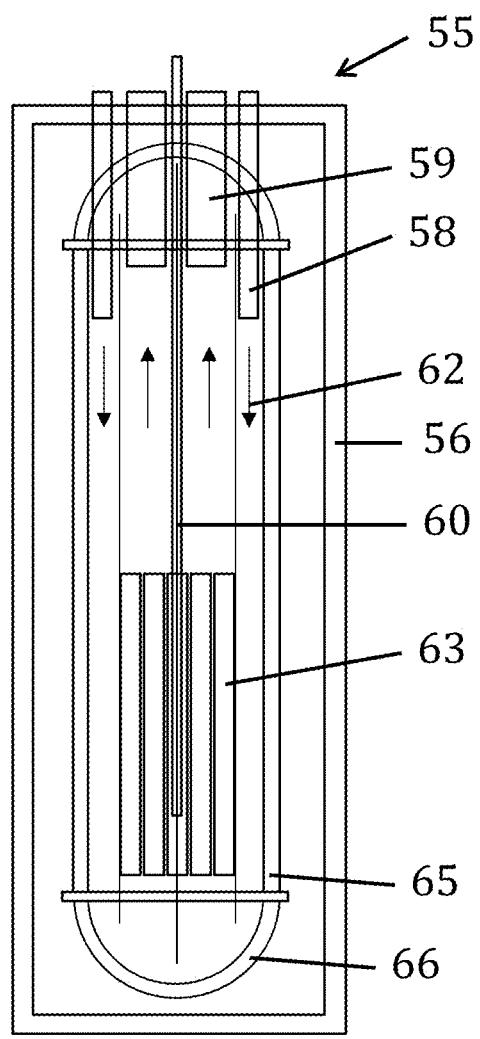
FIG. 11 is a schematic of an example spallation reactor.

FIG. 11 shows an example Neutron Spallation Incinerator comprising a Support Structure 56, Input Heat Exchanger 58 and Output Heat Exchanger 59 for managing the heat flow, a Center Proton Beam Tube 60 for receiving protons from a proton accelerator (or another source of protons, which could include a DDWA derived particle accelerator), Liquid Lead or lead-bismuth Coolant Flow 62 for cooling the reactor and for converting the received protons into neutrons for supporting the reaction, a ring of Fuel Rod Assemblies 63 which may contain a fuel such as thorium for undergoing fission which may be a subcritical reaction, a Containment vessel body 65, and a containment vessel dome 66.

Figure 12:
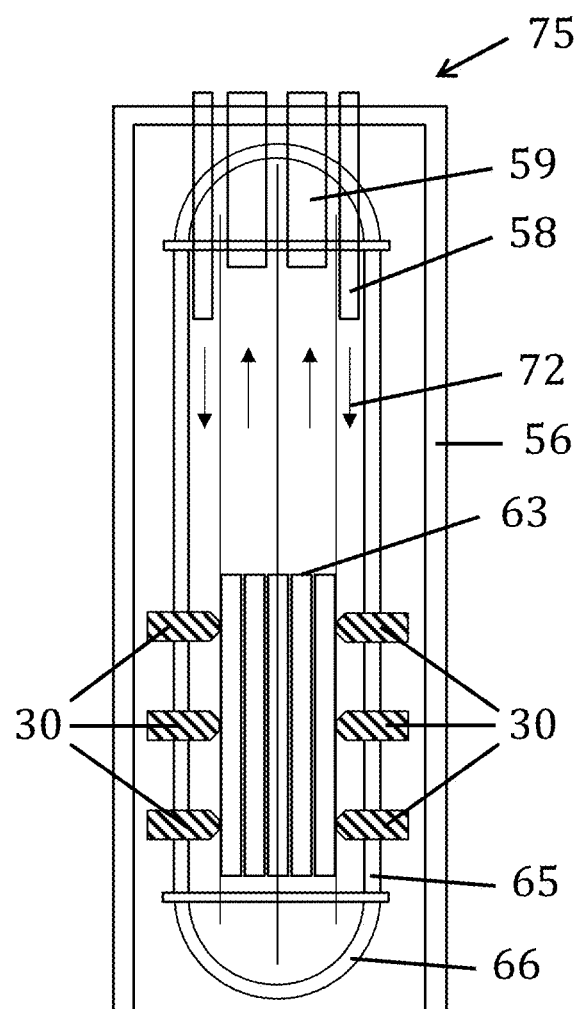
FIG. 12 is a schematic of an example spallation reactor using a plurality of gamma ray emitters.

FIG. 12 shows a modification of the Neutron Spallation Incinerator of FIG. 11 utilizing DDWA emitters to form a Gamma Ray Photo Fission Reactor 75, comprising a Heavy Water Coolant Flow path 72, a plurality of DPF-DDWA-Reflectron emitter Assemblies 30, a Support Structure 56, an Input Heat Exchanger 58, an Output Heat Exchanger 59, a Center Proton Beam Tube 60, a Ring of Fuel Rod Assemblies 63 comprising the desired radioactive fuel, a Containment vessel body 65, and a Containment vessel dome.

Such a reactor as shown in FIGS. 11 or 12 can be used to generate heat for various purposes, such as electrical power generation, for example, while simultaneously reducing the radiation of the radioactive nuclear fuel. Thus, such a reactor can be used as a means of disposing of radioactive waste or other radioactive materials while generating power at the same time. Alternatively, the system can be used to provide a means of generating electricity using radioactive materials operating at subcritical levels, providing a safer nuclear generation capability than typical designs that operate at critical levels.

Figure 13:
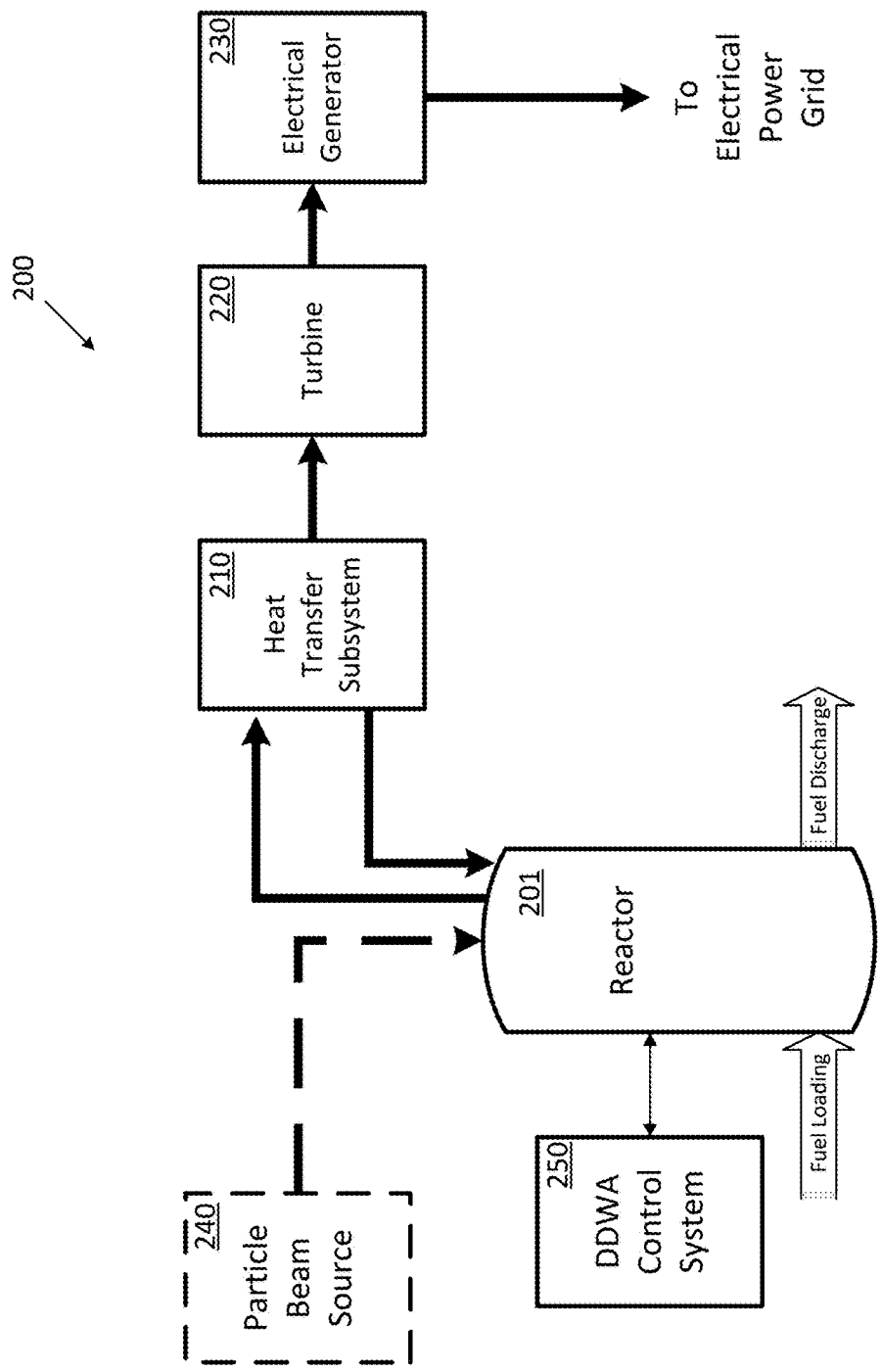
FIG. 13 is a schematic of an example system for generating electricity using one of the example reactors.

FIG. 13 shows an example system 200 for generating electricity, such as might utilize the reactor 75 of FIG. 12, for example. The system has a reactor 201 connected to a heat transfer subsystem 210 that can include pumps, heat exchanger, and fluid piping (as is known in the art) to transfer heat generated by the reactor 201 for driving a turbine 220 to drive a generator 230 for generating electricity, such as can be used to supply energy to an electrical power grid, a factory, or another consumer of electrical power.

The system 200, if it utilizes a neutron spallation reaction, can optionally connect to a source of nuclear particles 240 (such as protons) for use in the nuclear reaction. A conventional proton accelerator could be utilized, or a DDWA device could be used as a source of the nuclear particles. For a reactor 201 that uses DDWA gamma ray emitters, such as described herein, can be connected to a control system 250 to control the emissions of gamma rays, in order to at least partially control the rate of nuclear reaction occurring within the reactor. Such a reaction can be subcritical, or critical, or supercritical, or a combination of these (such as in phases as fuel is depleted). For some reactor designs that operate above the critical point, the source of particles 240 may not be needed, whereas such a source may be required when the nuclear reaction is subcritical, as discussed above regarding the reactor 55 of FIG. 11.

As an example, the nuclear reactors disclosed herein can specifically provide for the utilization of Gamma Ray and/or Neutron spallation as single or dual sources in a liquid lead, heavy water or Carbon Dioxide cooled core design, in which existing Fuel rod assemblies designs, that are depleted in U-335, are transmuted while still in the as removed assemblies that are commonly used in Pressure Water Reactors.

These design concepts can utilize a typically vertical design configuration with an array of typically 24 fuel rod assemblies (other numbers of fuel rods can be utilized) and as few as one fuel rod assembly, in a containment vessel or appropriate material construction. In any configuration, an evacuated beam tube can be employed and mounted in the center aperture of an array, or provided adjacent to said fuel rod assembly, as in the case described in the Neutron spallation reaction similar to the Rubbia Energy Amplifier. This beam tube is positioned in the center of the array bundle and can be translated axially in place, such that dense fast or slow spallation neutrons can be generated and delivered along the length of the array bundle. This permits the uniform irradiation by neutron radiation fields from the lead at the end of the beam tube usually in the center of the array. If the system design is heavy water or Carbon Dioxide cooled, then the spallation target (usually but not limited to, lead) is at the end of the beam tube and resides there in use. Pebble bed and other fuel designs can also be utilized, as desired.

For the Photo Fission reactor version, the Gamma Ray generation portion, as described above, is further comprised of multiple DDWA Gamma Ray generators (emitters) provided around the outside of the array for providing gamma rays impinging on the nuclear fuel to trigger and control fission reactions. These generators can also be translated along the vertical axis of the fuel rod bundle assembly, providing a photo-fission functionality that can be controlled by controlling the gamma ray output of the emitters.

Designs similar to pressure water reactors can be utilized, in that it uses a steel pressure vessel. However, in such a design the windows are mounted similar to those of a submarine type system or ports through which the emitters portion of the Gamma Ray emitters are mounted, within the vessel chamber. This sub design for the internally mounted emitter section could comprise a sapphire or quartz tube section that would be a radial aperture for the Gamma Rays generated in the trans-uranium emitter oxide ceramic that is shaped in a long aspect ratio cone. In either case these tubes are devices that are transparent to the generated Gamma Rays.

The feature of using internal DDWA emitters in a reactor is designed to permit photo fission of the fuel rod assembly at various axial locations of the pressure vessel containing the fuel rod assemblies. However, in an example design the Gamma Ray and Neutron reflector material are incorporated as a liner on the inner surface of the pressure vessel wall. Designers familiar in the art of such pressure vessels used in Pressure Water Reactors will realize that such a liner might preferably be isolated from the coolant and would incorporate such design particulars.

The safety of this system is enhanced by the fact that the fuel rod assemblies can be depleted in U-235 and as such are subcritical in nature. This means that if the neutron and gamma ray beams are turned off the power generation is stopped. There will be a similar heat spike in time after shut down as Np-227 reaches peak output but the materials and such systems are built to withstand this.

A single accelerator section can be provided to produce a beam that would penetrate a 1 mm window of Beryllium or an-SiC, and have enough energy to penetrate and photo fission fuel in a circulating powdered core consisting of about a cubic foot of Thorium Oxide that is being circulated by high speed $CO_2$ gas carrier propelled by a SiC fan or Turbine spun on a shaft. The gas/particle flow would be in a toroid flow pattern and the diameter of the core drum would be about 70 cm (active area=3800 cm² area per cm of length) and the length would be about 1 meter, although 150 cm would work as well. The average target density of the circulating powder would be about 1 gram per cc. This works out to be about 10% of the 10.2 grams per cc density of Thorium Oxide. If the powder is dry to avoid clumping, the ceramic itself is good for 3,384 degrees C. Using a double circulation system that uses a turbine to lift the particles off the bottom and another to create vortexes would preferentially place the highest particle density at the top of the vortexes.

The Core could be based on the EA architecture operating with circulating powder medium and the target average density would be about 1 g/cc. This could be surrounded by a coil pickup system, to capture kinetic energy as the particle travels through the core with the expectation that the particle would travel several inches before impacting another Thorium Oxide particle or the cooling/pickup coils in the core (e.g., made from Molybdenum).

The magnetic portion could capture about as much energy as the heat recovery system, with an ultimate efficiency of ~65%. This feature would allow the heat recovery portion to operate at just the inner coil's uptake rate (e.g., about 6.6 MW/100 cm)—having the outer surface as a backup and running the battery in overdrive to produce 10-20 MW. This would provide on demand power plant for desired applications.

The $CO_2$ would be at atmospheric pressure inside the drum, and would be adjusted passively by use of a ceramic filter element feeding into a ballast $CO_2$ reservoir. For example, providing 6 DDWAs in a Hexagonal pattern on top of the core with the PMA Motor mounted in the center of the DDWA array, such that it could be lifted out vertically when it failed, is an example approach. The beam could be throttled to obtain Proton penetration the length of the core, as desired.

Such an approach could be capable of running for a long period, such as five years at 16-32 MW and cooling coils at the outside of the 70 cm diameter drum that is 100-150 cm long could provide a heat transfer rate at 500° C. and hence about 500 watts per cm² but 300 per cm² is a more conservative number. At that rate the inner surface can handle 9.89 MW per side, so there is an extra allowance for the other three surfaces on the square tubing. If gas circulation is provided on the outer coil surface, then the rate would be double.

The mass in the core of an example unit would be about 380,000 cc or 570,000 cc volume at 10.2 grams per cc of ThO itself, but operated at 1 gram per cc dispersed powder. This results in a Thorium charge of ~380 Kg for the 1 meter length (1.315 ft^3 of ThO) and 1.5 times that for the 1.5 meter length (570 Kg ThO) being capacity. The expected burn rate would be about 10% over 5 years, and the output rate would be about $88.25 \times 10^{\wedge}12$ J/Kg. However, this also means that the beam current can be throttled to the upper limits of the Moly cooling tubes (e.g., 1 cm square or round tubing near the periphery of the drum and a helix coil covering fan spindle at 8 cm diameter). The SiC parts should be acceptable all the way to 1,000° C. or more.

Radioactive Decontamination

The above DDWA-Reflectron Gamma Ray generation (emitter) devices can also be provided with the emission conversion target mounted at the focal point of a set of grazing incidence mirrors. This design permits mounting the device on a mobile platform with a gimbaled aim-able mirror support structure. This concept permits the target in the mirror focal point to be adjusted, permitting collimation or focusing in a practical device onto a desired target, such as for decontaminating a radioactive contaminated target.

This concept can provide a multi-hundred kilowatt directable energetic Gamma Ray beam which can be deployed to decontaminate a contaminated site, such as a decommissioned reactor or waste, or due to a nuclear attack or terrorist attack site in which a dirty bomb has been used, or for remediation of sabotaged or a natural disaster damaged reactor, such as occurred in Fukushima Japan due to the earthquake and tsunami. Contaminated waste sites could also be decontaminated by such a device.

Figure 14:
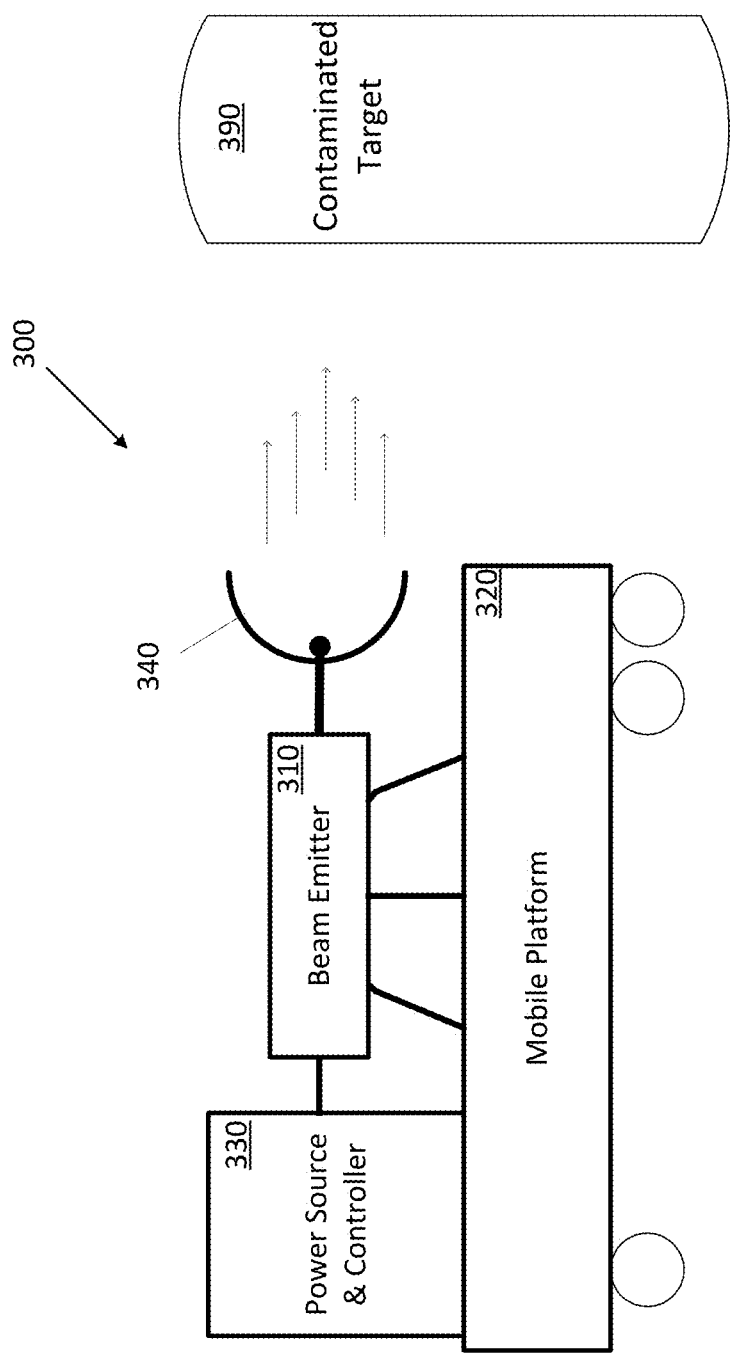
FIG. 14 is a schematic of an example mobile nuclear decontamination system.

FIG. 14 provides an example of such a system 300. One or more controllable beam emitters 310 (e.g., DDWA based gamma ray generators as described herein) are arranged on a mobile platform 320. A beam focusing and directing apparatus 340 (which may include mirrors or other reflectors, lenses, and/or various directing motors or solenoids, hinges, gears, etc.) is provided to direct the emitter output beam toward the contaminated target 390. A mobile control and power source 330 is provided to control the emitter 340 and the directing apparatus 340, although an external source of power could be used when available.

Such a device can be used for other purposes as well, such as a weapon or energy source for transmitting energy, for example.

An example DDWA gamma ray generator of about 125 MeV at up to a 200 mA beam device can be provided as one example embodiment that could be utilized in the system 300. Such devices can be operated in series to boost the emitter beam output. Protons, Deuterons or Alpha particles can be used to split Thorium Nuclei as well as spallation neutrons. Energy numbers of about 8 MeV±2 MeV Proton, 16 MeV±4 MeV Deuteron, or about 32 MeV±8 MeV for Alpha particles are the target energy for fissioning Thorium, with other types of beams being used to decontaminate other radioactive substances, such as plutonium, uranium, radium, americium, etc.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A nuclear reactor comprising:
a radioactive fuel source comprising at least one portion;
an emitter device configured to generate gamma rays directed at the radioactive fuel source portion in the reactor to induce a nuclear reaction in the fuel source portion and to generate neutrons to support a neutron driven fission reaction in the radioactive fuel source portion;
a containment system for containing the radioactive fuel source and the emitter device; and
a heat extraction system configured to extract heat from the fission reaction in the radioactive fuel source for transmission outside of the reactor.

2. The nuclear reactor of claim 1, wherein said emitter device further comprises a capacitor element for accelerating charged particles, the capacitor element including a pair of electrodes with at least one of said electrodes at least partially coated with diamond or a diamond-like carbon material.

3. The nuclear reactor of claim 2, wherein a source of the charged particles generated by a plasma flux proton injector device is provided to the emitter device.

4. The nuclear reactor of claim 1, further comprising a source of protons for interacting with a material provided or circulated in the reactor to create neutrons to support the nuclear reaction.

5. The nuclear reactor of claim 1, further comprising a plurality of photo switches arranged around a capacitor element for providing a uniform current flow during a discharge.

6. The nuclear reactor of claim 5, wherein each one of said photo switches is comprised of a diamond crystal.

7. The nuclear reactor of claim 5, wherein said photo switches are activated in a controlled manner to facilitate a uniform current flow during operation of the emitter device to at least partially control a rate of radioactive decay of the fuel source.

8. The nuclear reactor of claim 1, further comprising at least one cooling system for circulating a coolant in the emitter device.

9. The nuclear reactor of claim 1, further comprising a plurality of said emitter devices all configured to generate gamma rays directed at the radioactive fuel source.

10. The nuclear reactor of claim 1, wherein said emitter device is provided within a polygon-shaped vessel, said vessel comprising a portion of the fuel source, with a heat exchanger provided in each wall of the vessel.

11. The nuclear reactor of claim 1, wherein said emitter device further comprises a capacitor element for accelerating charged particles, the capacitor element including a pair of electrodes with at least one of said electrodes at least partially coated with a diamond-like carbon material.

12. The nuclear reactor of claim 1, wherein said reactor is operated in a sub-critical state, and wherein a rate of radioactive decay of the fuel source is at least partially controlled by a control system that controls the emission of gamma rays from the emitter device.

13. A nuclear reactor comprising:
a radioactive fuel source comprising at least one portion;
an emitter device configured to generate an energy beam directed at the radioactive fuel source portion in the reactor to induce a nuclear reaction in the fuel source portion and to generate neutrons to support a neutron driven fission reaction in the radioactive fuel source portion, said emitter device comprising:
a source of charged particles,
a plurality of capacitor elements for accelerating the charged particles, each capacitor element including a pair of electrodes, and
a conduit formed through the capacitor element for transmitting the charged particles, wherein
at least one of the capacitor electrodes is at least partially coated with diamond or diamond-like carbon;
a containment system for containing the radioactive fuel source and the emitter device;
a cooling system for cooling said emitter device; a radioactive fuel source; and
a heat extraction system configured to extract heat from the fission reaction in the radioactive fuel source for transmission outside of the reactor.

14. The nuclear reactor of claim 13, wherein the source of the charged particles is a dense plasma flux proton injector device.

15. The nuclear reactor of claim 13, further comprising a source of protons for interacting with a material provided or circulated in the reactor to create neutrons to support the nuclear reaction.

16. The nuclear reactor of claim 13, further comprising a plurality of photo switches arranged around the capacitor element for providing a uniform current flow during a discharge.

17. The nuclear reactor of claim 16, wherein each one of said photo switches is comprised of a diamond crystal.

18. The nuclear reactor of claim 16, wherein said photo switches are activated in a controlled manner to facilitate a uniform current flow during operation of the emitter device to at least partially control a rate of radioactive decay of the fuel source.

19. The nuclear reactor of claim 13, further comprising a plurality of said emitter devices all configured to generate energy beams directed at the radioactive fuel source.

20. The nuclear reactor of claim 13, wherein said plurality of capacitor elements are stacked to form a capacitor array configured to accelerate the charged particles through the conduit which is formed through the capacitor array, each one of said capacitor elements comprising: at least one electrode including diamond or diamond-like carbon, and at least one photo switch configured for activation during a discharge of the capacitor element.

21. The nuclear reactor of claim 13, wherein said emitter device generates gamma rays of an energy of about 10-17 MeV.

22. The nuclear reactor of claim 13, wherein said radioactive fuel includes substantial amounts of thorium or depleted uranium.

23. The nuclear reactor of claim 13, wherein said energy beam is substantially comprised of gamma rays.

24. The nuclear reactor of claim 13, wherein said energy beam is substantially comprised of nuclear particles.

25. A nuclear reactor comprising:
    a radioactive fuel source comprising at least one portion;
    an emitter device configured to generate an energy beam substantially comprised of gamma rays directed at the radioactive fuel source portion to induce a nuclear reaction in the fuel source portion and to generate neutrons to support a neutron driven fission reaction in the radioactive fuel source portion, said emitter device comprising:
        a source of charged particles,
        a plurality of capacitor elements for accelerating the charged particles, each capacitor element including a pair of electrodes with each electrode being coated with diamond or diamond-like carbon,
        a plurality of photo switches arranged around the capacitor element for providing a uniform current flow during a discharge, and
        a conduit formed through the capacitor element for transmitting the charged particles;
    a containment system for containing the radioactive fuel source and the emitter device;
    a cooling system for cooling said emitter device; a radioactive fuel source; and
    a heat extraction system configured to extract heat from the fission reaction in the radioactive fuel source for transmission outside of the reactor.

26. A method of generating heat in a nuclear reactor comprising a radioactive fuel source comprising at least one portion, a containment system, and a cooling system, said method comprising the steps of:
    providing an emitter device comprising:
        a source of charged particles,
        a plurality of capacitor elements for accelerating the charged particles, each capacitor element including a pair of electrodes, and
        a conduit formed through the capacitor element for transmitting the charged particles, wherein
        each one of the capacitor electrodes is at least partially coated with diamond or diamond-like carbon;
    the emitter device generating an energy beam substantially comprised of gamma rays directed at the radioactive fuel source portion in the reactor to induce a nuclear reaction in the fuel source portion and to generate neutrons to support a neutron driven fission reaction in the radioactive fuel source portion;
    the containment system containing the radioactive fuel source and the emitter device;
    the cooling system cooling said emitter device; and
    the heat extraction system extracting heat from the fission reaction in the radioactive fuel source for transmission outside of the reactor.

27. The method of claim 26, wherein the source of the charged particles is a dense plasma flux proton injector device.

28. The method of claim 26, further comprising a source of protons for interacting with a material provided or circulated in the reactor to create neutrons to support the nuclear reaction.

29. The method of claim 26, further comprising a plurality of photo switches arranged around the capacitor element for providing a uniform current flow during a discharge.

30. The method of claim 29, wherein each one of said photo switches is comprised of a diamond crystal.

31. The method of claim 29, wherein said photo switches are activated in a controlled manner to facilitate a uniform current flow during operation of the emitter device to at least partially control a rate of radioactive decay of the fuel source.

32. The method of claim 26, further comprising a plurality of said emitter devices all configured to generate energy beams directed at the radioactive fuel source.

33. The method of claim 26, wherein said plurality of capacitor elements are stacked to form a capacitor array configured to accelerate the charged particles through the conduit which is formed through the capacitor array, each one of said capacitor elements comprising: at least one electrode including diamond or diamond-like carbon, and at least one photo switch configured for activation during a discharge of the capacitor element.

34. The method of claim 26, wherein said emitter device generates gamma rays of an energy of about 10-17 MeV.

35. The method of claim 26, wherein said radioactive fuel includes substantial amounts of thorium or depleted uranium.

* * * * *